3,112,180
METHOD FOR THE PREPARATION OF DIBORANE
Robert D. Schultz, East Whittier, Calif., assignor to Aerojet-General Corporation, Azusa, Calif., a corporation of Ohio
No Drawing. Filed Mar. 10, 1955, Ser. No. 493,570
17 Claims. (Cl. 23—204)

This invention relates to a new and improved method of preparing diborane.

Diborane is an excellent high energy fuel. Unfortunately, however, its use has been severely limited due to a lack of a convenient and inexpensive method for preparing it in high yield.

Heretofore, diborane has been prepared by reacting alkali metal borohydrides with hydrogen chloride gas at room temperature or with liquid hydrogen chloride at a temperature of −78° C. These methods are very slow, requiring reaction times of from 16 to 24 hours. In addition, the separation of diborane from the resulting 70% diborane–30% hydrogen chloride azeotropic mixture is very difficult.

It has long been desired as a matter of cost, convenience and commercial feasibility, to produce diborane by using sulfuric acid as the protolyzing acid, preferably at room temperature. Unfortunately, when alkali metal borohydrides were reacted with concentrated sulfuric acid instead of diborane, boron oxides were produced with explosive violence. In an attempt to avoid oxidation, dilute sulfuric acid was substituted in the reaction. Although the borohydride-dilute sulfuric acid reaction was not explosive, hydrolysis occurred producing boric acid instead of diborane.

We have now found that diborane is rapidly and safely produced in good yield by reacting a metal borohydride with concentrated sulfuric or chlorosulfonic acid in the presence of a weak, inorganic nonoxidizing acid or with an alkali metal salt or alkyl ester of such an acid, in accordance with the general reaction scheme set forth below:

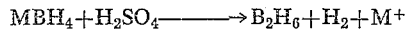

$$MBH_4 + H_2SO_4 \longrightarrow B_2H_6 + H_2 + M^+$$

wherein M is a metal radical. Due to the non-volatile characteristics of sulfuric acid, an azeotropic mixture of gases is avoided. Although rapid, the reaction proceeds smoothly and gently without sparking, flaming, or explosions.

Suitable modifiers are the phosphoric acids such as orthophosphoric, metaphosphoric and pyrophosphoric acids; the fluorinated phosphoric acids such as monofluoro and difluorophosphoric acid; boric acid; the alkali metal salts of the above acids such as sodium dihydrogen phosphate, potassium phosphate, sodium difluorophosphate and lithium borate; and the alkyl esters of the above acids such as triquatradecyl borate, tridodecyl borate, tridodecyl phosphate, pentyl difluorophosphate and diheptyl phosphate.

As a matter of convenience, alkali and alkaline earth metal borohydrides such as potassium and lithium borohydride are usually employed as starting materials. Commerical grade sulfuric acid, ordinarily containing from about 95% to about 98% by weight pure hydrogen sulfate and about 5% to about 2% by weight water is ordinarily used as the protolyzing acid. Chlorosulfonic acid decomposes in water and therefore it is preferred that the system be anhydrous when this acid is employed. Mixtures of chlorosulfonic and sufuric acid may also be used if desired.

In accordance with the present invention, sulfuric or chlorosulfonic acid containing a weak, inorganic nonoxidizing acid, or an alkali metal salt or alkyl ester of such an acid, usually in amounts of from about 2% to about 10% by weight of the acid, is reacted with a metal borohydride and diborane gas is evolved. The preferred method of conducting the reaction is to dissolve the weak inorganic acid, salt or ester in the sulfuric or chlorosulfonic acid, with heating if necessary to effect solution. The reaction is usually conducted in a reactor equipped with a gas outlet leading to a low temperature trap. The acid solution is placed in the reactor and finely divided borohydride added with agitation. During the course of the reaction, a gentle evolution of hydrogen and diborane gases takes place. These gases are vented through the gas outlet and collected in the low temperature trap. If desired, the reaction can also be conducted in vacuum or a nitrogen atmosphere as well as in air.

To more clearly illustrate this invention, the following examples are presented. It is to be understood, however, that these examples are presented merely as a means of illustration and are not intended to limit the scope of the invention in any way.

EXAMPLE I

Fluorinated Phosphoric Acid Moderation

Anhydrous monofluorophosphoric acid in an amount of 10% by volume was dissolved in 100 cc. concentrated sulfuric acid. The solution was placed in a 3-necked flask equipped with a wire stirrer, a gas outlet leading to a low temperature trap, and a dropping funnel. The reactor was swept out with nitrogen and a nitrogen gas flow was maintained through the dropping funnel. 5 gm. of powdered sodium borohydride was dropped into the acid with rapid stirring. The reaction proceeded smoothly and quietly with no sparking or flaming. Visible evolution of gas ceased in less than 10 minutes. Diborane was recovered in a yield of more than 80%.

EXAMPLE II

Dibasic Sodium Phosphate Moderation 1 cc. of a solution of 10% by weight of dibasic sodium phosphate, dissolved in concentrated sulfuric acid of 95% purity, was placed in a test tube and an 8-mesh crystal of sodium borohydride was added to the acid salt mixture. Diborane was gently evolved.

EXAMPLE III

Boric Acid Moderation

Boric acid in an amount of 10% by weight was dissolved in concentrated sulfuric acid. 50 cc. of the acid mixture was placed in a 3-necked flask fitted with a wire stirrer, a gas outlet leading to a low temperature trap, and a dropping funnel. The reactor was swept out with nitrogen and a nitrogen gas flow was maintained through the dropping funnel. 1 gm. of finely divided sodium borohydride was dropped into the acid mixture with stirring. A gentle evolution of gas occurred and a 73% yield of diborane was recovered in the low temperature trap.

EXAMPLE IV

Boric Acid Moderation

Using the apparatus described in Example III, 5 gm. of sodium borohydride was reacted with 70 cc. of 90% sulfuric acid and 10% boric acid. Formation of a heavy white precipitate occurred and diborane was recovered in a 53% yield.

EXAMPLE V

Boric Acid Moderation

A 1 cc. sample of concentrated sulfuric acid containing 10% by weight boric acid was placed in a test tube, and a 8-mesh crystal of sodium borohydride was dropped into the solution. A gentle evolution of gas occurred and diborane was identified by its infrared spectrum.

EXAMPLE VI

Tridodecyl Borate Moderation

To a 10 cc. sample of concentrated sulfuric acid of 97% purity was added 2 drops of tridodecyl borate. An 8-mesh sodium borohydride crystal was dropped into the solution. Gentle evolution of gas occurred and diborane was identified by its infrared spectrum.

EXAMPLE VII

Tri-n-Butyl Borate Moderation

A 1 cc. sample of concentrated sulfuric acid containing 5% by weight tri-n-butyl borate was placed in a test tube and an 8-mesh crystal of sodium borohydride was dropped into the solution. A gentle evolution of gas occurred and diborane was identified by its infrared spectrum.

Optimum results are obtained by first dissolving the modifier in the protolyzing acid and subsequently adding the metal borohydride to the solution. This procedure provides a homogeneous reaction mixture in which maximum protection of the metal borohydride particles from the oxidizing influence of the protolyzing acid is obtained as well as maximum surface area for reaction. It is often desirable to heat the modifier-protolyzing acid mixture to effect solution, however the temperature at which the diborane producing reaction proceeds is not limited by this expedient. The reactants and products of the reaction are thermally stable and the temperature at which the reaction is conducted is not critical, although as a matter of convenience the reaction is conducted at about room temperature.

I have invented a means of moderating the reaction of borohydrides with sulfuric or chlorosulfonic acid so that diborane is produced safely, rapidly, and conveniently. Due to the inexpensiveness and availability of sulfuric acid, ease of running the reaction at ordinary temperatures, and the convenience of recovering diborane from the reaction mixture, the above described method of preparing diborane will find valuable use in the production of this high energy fuel. As well as being useful as a high energy fuel, diborane also finds valuable use in vulcanizing rubber, as disclosed in United States Patent No. 2,558,559.

I claim:

1. A method of producing diborane which comprises reacting a protolyzing acid selected from the group consisting of concentrated chlorosulfonic, concentrated sulfuric acid and mixtures thereof with a metal borohydride selected from the group consisting of the alkali and alkaline earth metal borohydrides in the presence of a reaction modifier selected from the group consisting of the phosphoric acids, fluorinated phosphoric acids, boric acids, the alkali metal salts and the alkyl esters thereof.

2. The method of claim 1 wherein said modifier is present in an amount of from about 2% to about 10% by weight of the protolyzing acid.

3. The method of claim 1 wherein the said modifier is monofluorophosphoric acid.

4. The method of claim 1 wherein the said modifier is orthophosphoric acid.

5. The method of claim 1 wherein the said modifier is dibasic sodium phosphate.

6. The method of claim 1 wherein the said modifier is boric acid.

7. The method of claim 1 wherein the said modifier is tridodecyl borate.

8. The method of claim 1 wherein the said modifier is tri-n-butyl borate.

9. The method of claim 1 wherein said protolyzing acid and said modifier are first mixed together and said metal borohydride then added to the mixture.

10. A method of preparing diborane which comprises reacting sodium borohydride with concentrated sulfuric acid in the presence of from about 2% to about 10% monofluorophosphoric acid by weight of the sulfuric acid.

11. A method of preparing diborane which comprises reacting sodium borohydride with concentrated sulfuric acid in the presence of from about 2% to about 10% orthophosphoric acid by weight of the sulfuric acid.

12. A method of preparing diborane which comprises reacting sodium borohydride with concentrated sulfuric acid in the presence of from about 2% to about 10% dibasic sodium phosphate by weight of the sulfuric acid.

13. A method of preparing diborane which comprises reacting sodium borohydride with concentrated sulfuric acid in the presence of from about 2% to about 10% boric acid by weight of the sulfuric acid.

14. A method of preparing diborane which comprises reacting sodium borohydride with concentrated sulfuric acid in the presence of from about 2% to about 10% tridodecyl borate by weight of the sulfuric acid.

15. A method of preparing diborane which comprises reacting sodium borohydride with concentrated sulfuric acid in the presence of from about 2% to about 10% tri-n-butyl borate by weight of the sulfuric acid.

16. A method of preparing diborane which comprises reacting sodium borohydride with concentrated sulfuric acid in the presence of about 10% orthophosphoric acid by weight of the sulfuric acid.

17. A method of preparing diborane which comprises reacting sodium borohydride with concentrated sulfuric acid admixed with a reaction moderating amount of orthophosphoric acid.

References Cited in the file of this patent

UNITED STATES PATENTS 2,543,511    Schlesinger et al.    Feb. 27, 1951

FOREIGN PATENTS 451,359    Great Britain    Aug. 4, 1936

OTHER REFERENCES

Kilpatrick et al.: "J. Am. Chem. Soc.," vol. 72, pages 5474–5476 (1950).

Hurd: "Chemistry of the Hydrides," page 162 (1952), published by John Wiley & Sons, New York, N.Y.

Schechter et al.: "Boron Hydrides and Related Compounds," pages 21, 44, Jan. 8, 1951, declassified Jan 5, 1954, Dept. of the Navy, Bureau of Aeronautics.

Stock: "Hydrides of Boron and Silicon," 1933, pages 40–42.

Weberg et al.: "Zeitschrift für Naturforschung," vol. 7b, pages 58–59 (1952).

Schechter et al.: "Boron Hydrides and Related Compounds," prepared under Contract $NO_2(s)$ 10992 for Dept. of Navy, Bureau of Aeronautics, prepared by Callery Chemical Co., printed March 1951, declassified Dec. 1953, page 21.